United States Patent
Yau et al.

(10) Patent No.: US 12,526,879 B2
(45) Date of Patent: Jan. 13, 2026

(54) IMS PDN/PDU FOR EMERGENCY CALL

(71) Applicant: T-Mobile USA, Inc., Bellevue, WA (US)

(72) Inventors: Hang Hoi Yau, Sammamish, WA (US); Christopher Joul, Bellevue, WA (US); Hyung Keun Choi, Overland Park, KS (US); Lin Zhang, Overland Park, KS (US); Syed Hassan Raza, Overland Park, KS (US); William Hooker, Seattle, WA (US); Srinivasa Rao Bodapotula, Bellevue, WA (US); Anthony James Wageman, Lees Summit, MO (US)

(73) Assignee: T-Mobile USA, Inc., Bellevue, WA (US)

( * ) Notice: Subject to any disclaimer, the term of this patent is extended or adjusted under 35 U.S.C. 154(b) by 356 days.

(21) Appl. No.: 18/303,513

(22) Filed: Apr. 19, 2023

(65) Prior Publication Data

US 2024/0357707 A1 Oct. 24, 2024

(51) Int. Cl.
*H04W 76/50* (2018.01)
*H04L 65/1016* (2022.01)

(52) U.S. Cl.
CPC ......... *H04W 76/50* (2018.02); *H04L 65/1016* (2013.01)

(58) Field of Classification Search
CPC ..... H04W 76/50; H04W 60/04; H04W 76/14; H04W 88/04; H04W 36/125; H04W 40/22; H04L 65/1016

USPC ...................................................... 455/404.1
See application file for complete search history.

(56) References Cited

U.S. PATENT DOCUMENTS

| | | | | |
|---|---|---|---|---|
| 8,630,607 | B2 * | 1/2014 | Shaikh .............. | H04W 36/0066 455/552.1 |
| 2010/0014508 | A1 * | 1/2010 | Yang ................... | H04L 65/1069 370/352 |
| 2013/0188607 | A1 * | 7/2013 | Mutikainen ..... | H04W 36/00226 370/331 |
| 2015/0016420 | A1 * | 1/2015 | Balabhadruni . | H04W 36/00226 370/331 |
| 2018/0049071 | A1 * | 2/2018 | Xu ....................... | H04L 65/1069 |
| 2018/0213384 | A1 * | 7/2018 | Youn ...................... | H04W 4/90 |

(Continued)

*Primary Examiner* — Maria El-Zoobi
(74) *Attorney, Agent, or Firm* — Foley IP Law, PLLC

(57) ABSTRACT

Solutions for placing an emergency call over a wireless network improve speed and reliability by prioritizing using an internet protocol (IP) multimedia subsystem (IMS) packet data network (PDN) or protocol data unit (PDU) network (PDN/PDU) over domain reselection when a call attempt fails over an emergency PDN/PDU (EPDN/EPDU). Examples include establishing an IMS PDN/PDU session for a user equipment (UE) over a wireless network; attempting, by the UE, an emergency call using an EPDN/EPDU over the wireless network; and based on at least a failure of the emergency call over the EPDN/EPDU, reattempting the emergency call using the IMS PDN/PDU over the wireless network. Based on at least a failure of the emergency call over the IMS PDN/PDU, the UE performs domain reselection and reattempts the emergency call using a second wireless network. In some examples, wireless networks transmit a network policy for handling the emergency call to the UE.

20 Claims, 8 Drawing Sheets

(56) References Cited

U.S. PATENT DOCUMENTS

2020/0162879 A1* 5/2020 Lotfallah .............. H04W 76/18
2024/0205792 A1* 6/2024 Shah ................... H04L 65/1045

* cited by examiner though a figures listed below,
IMS PDN/PDU FOR EMERGENCY CALL

BACKGROUND

When a user equipment (UE) attempts to place an emergency call over a cellular network, the default behavior is for the UE to attempt to setup a new session over an emergency packet data network (EPDN) or emergency protocol data unit (EPDU) network (EPDN/EPDU). However, if there is a problem that prevents the call from connecting, the UE will perform domain reselection, and attempt to connect the emergency call using a different network—also through an EPDN/EPDU, but using the different network. Unfortunately, if the other network is unavailable for any reason, or the attempt through the other EPDN/EPDU fails, the UE's ability to make the emergency call will be frustrated and delayed.

SUMMARY

The following summary is provided to illustrate examples disclosed herein but is not meant to limit all examples to any particular configuration or sequence of operations.

Disclosed solutions for placing an emergency call over a wireless network improve speed and reliability by prioritizing using an internet protocol (IP) multimedia subsystem (IMS) packet data network (PDN) or protocol data unit (PDU) network (IMS PDN/PDU) over domain reselection when a call attempt fails over an emergency PDN (EPDN) or emergency protocol data unit (EPDU) network (EPDN/EPDU). Examples include establishing an IMS PDN/PDU session for a user equipment (UE) over a first wireless network: attempting, by the UE, an emergency call using an EPDN/EPDU over the first wireless network; and based on at least a failure of the emergency call over the EPDN/EPDU, reattempting the emergency call using the IMS PDN/PDU over the first wireless network. Based on at least a failure of the emergency call over the IMS PDN/PDU, the UE performs domain reselection and reattempts the emergency call using a second wireless network. In some examples, the first wireless network transmits, to the UE, a network policy for handling the emergency call.

BRIEF DESCRIPTION OF THE DRAWINGS

The disclosed examples are described below with reference to the accompanying drawing figures listed below, wherein.

Figure 1:
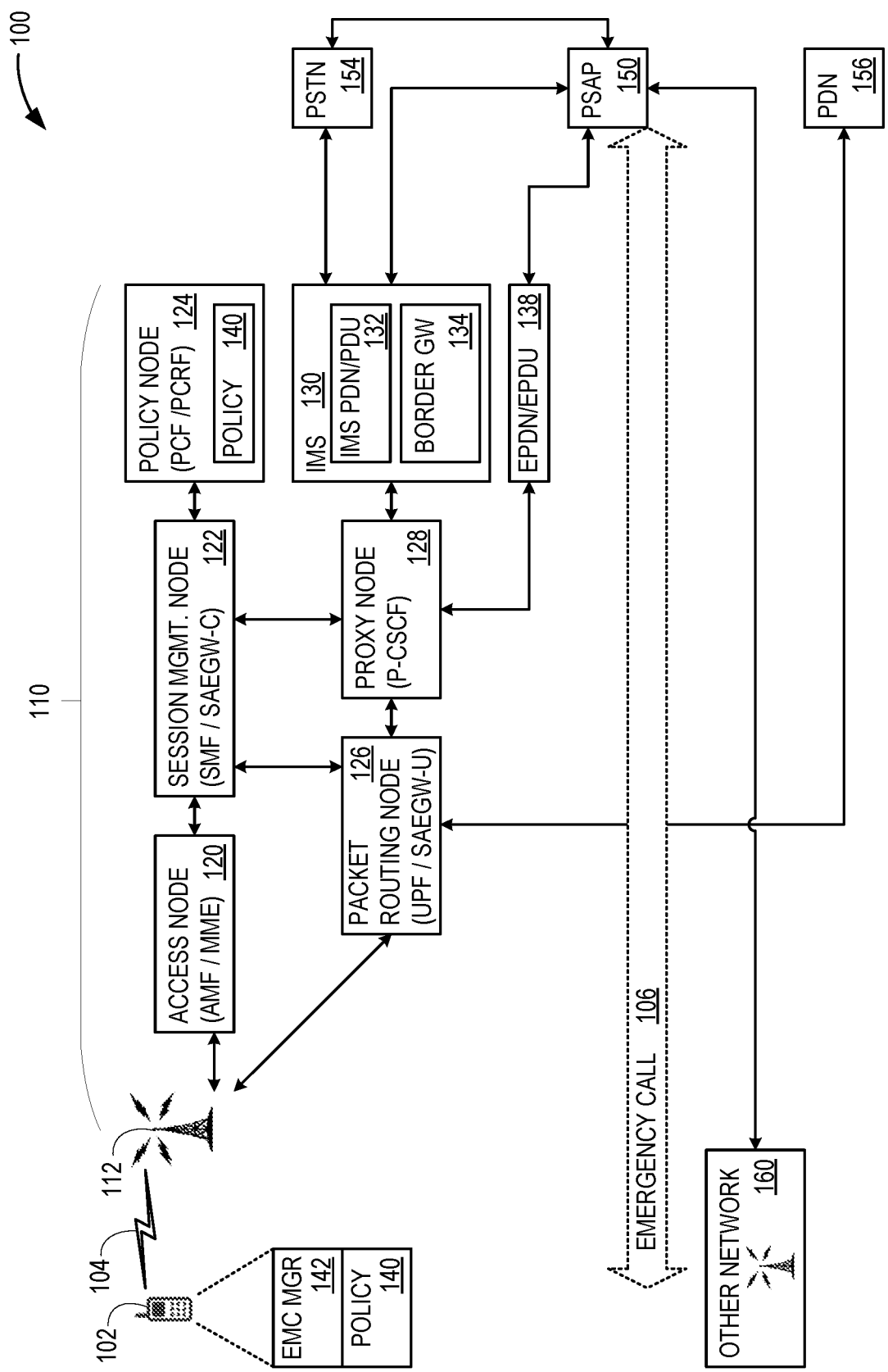
FIG. 1 illustrates an exemplary architecture that advantageously provides for making emergency calls over an internet protocol (IP) multimedia system (IMS) packet data network (PDN) or protocol data unit (PDU) network (IMS PDN/PDU)

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Disclosed solutions for placing an emergency call over a wireless network improve speed and reliability by prioritizing using an internet protocol (IP) multimedia subsystem (IMS) packet data network (PDN) or protocol data unit (PDU) network (IMS PDN/PDU) over domain reselection when a call attempt fails over an emergency PDN (EPDN) or emergency protocol data unit (EPDU) network (EPDN/EPDU). Examples include establishing an IMS PDN/PDU session for a user equipment (UE) over a first wireless network: attempting, by the UE, an emergency call using an EPDN/EPDU over the first wireless network; and based on at least a failure of the emergency call over the EPDN/EPDU, reattempting the emergency call using the IMS PDN/PDU over the first wireless network. Based on at least a failure of the emergency call over the IMS PDN/PDU, the UE performs domain reselection and reattempts the emergency call using a second wireless network. In some examples, the first wireless network transmits, to the UE, a network policy for handling the emergency call.

Aspects of the disclosure enhance public safety by improving the connection speed of emergency calls placed over cellular networks, as well as enabling emergency center call-back. This is accomplished, at least in part by, based on at least a failure of an emergency call over an EPDN/EPDU, reattempting the emergency call using an IMS PDN/PDU over a wireless network. This provides multiple advantages over current solutions, which are specified in Third Generation Partnership Project (3GPP) technical standards (TSs).

Advantages include faster call connection by avoiding time-consuming domain reselection, when the emergency call is successful with the IMS PDN/PDU; potentially improved location information for the UE available to first responders; and providing for emergency center call-back. Emergency calls placed by UEs over cellular networks, for example enhanced 911 (e911) calls in the United States (US) and enhanced 112 (e112) calls in the European Union (EU), are typically answered and handled by a public safety answering point (PSAP). If the emergency call is disconnected, the PSAP may need to call the UE back.

However, if the UE performed domain reselection, and is on a visited network, not fully authenticated, the UE callback information (e.g., the UE phone number) might not be provided to the PSAP. Further, the UE's location may not be known with the same degree of accuracy as to the visited network, as it had been to the cellular network on which it had been prior to domain reselection. Whereas the prior cellular network may have received global positioning system (GPS) coordinates from the UE, the visited network may not have had time to receive the GPS coordinates and so may only know the location of the UE based on the location of the serving base station. Thus, the proposed solution of retaining the UE on the original cellular network, and using the IMS PDN/PDU, rather than performing domain reselection (as specified by 3GPP in certain circumstances) improves public safety.

With reference now to the figures, FIG. 1 illustrates an architecture 100 that advantageously provides for a UE 102 placing an emergency call 106 over a wireless network 110 using an IMS PDN/PDU 132. UE 102 has an emergency call manager 142 (shown as EMC MGR) that controls the actions of UE 102 for placing emergency call 106 to a PSAP 150. Emergency call manager 142 uses a network policy 140 that, in some examples is downloaded from wireless network 110, to dictate how UE 102 reattempts emergency call 1-6 when experiencing call failures.

In some examples, UE 102 has a version of network policy 140 installed by its home network. In some examples, UE 102 downloads network policy 140 upon registration with a new wireless network, such as wireless network 110 or other wireless network 160. In some examples, wireless networks 110 and 160 push their own copies of network policy 140 to all UEs that register. In examples in which wireless networks 110 and 160 have different versions of network policy 140, network policy 140 is based on which wireless network to which UE 102 is attached.

For example, if UE 102 reports its location (e.g., GPS coordinates) to wireless network 110 as being somewhere in which UE 102 is also likely within coverage of wireless network 160, wireless network 110 selects and sends UE 102 network policy 140 that instructs UE 012 to (1) attempt emergency calls first with an EPDN/EPDU, then if that attempt fails, (2) next attempt with an IMS PDN/PDU, then if that attempt fails, (3) next perform domain reselection and attempt the emergency call on the new network (e.g., cellular network 160).

However, if UE 102 reports its location to wireless network 110 as being somewhere in which UE 102 is likely not within coverage of any other wireless network other than wireless network 110, domain reselection will waste valuable time for the user of UE 102. So instead, wireless network 110 selects and sends UE 102 a different network policy 140 that instructs UE 012 to (1) attempt emergency calls first with an EPDN/EPDU, then if that attempt fails, (2) next attempt with an IMS PDN/PDU, then if that attempt fails, (3) alternate between attempting with the EPDN/EPDU again and the IMS PDN/PDU again and only try domain reselection after some specified minimum number of further attempts with the EPDN/EPDU and IMS PDN/PDU.

UE 102 connects to a radio access network (RAN) 112 of wireless network 110 using an air interface 104. Wireless network 110 also has an access node 120, a session management node 122, a policy node 124, a packet routing node 126, and a proxy node 128. In some examples, wireless network stories copies of network policy 140 in policy node 124, and in some examples may have multiple network policies 140 that are selected based on at least the location of UE 102. In some examples, proxy node 128 comprises a proxy call session control function (P-CSCF).

In fifth generation (5G) cellular examples, RAN 112 comprises a gNode B (gNB), access node 120 comprises an access mobility function (AMF), session management node 122 comprises a session management function (SMF), policy node 124 comprises a policy control function (PCF), and packet routing node 126 comprises a user plane function (UPF). Also, in 5G, IMS PDN/PDU 132 uses a PDU network. In fourth generation (4G) cellular examples, RAN 112 comprises an eNodeB (eNB), access node 120 comprises a mobility management entity (MME), session management node 122 comprises a system architecture evolution gateway (SAEGW) control plane (SAEGW-C), policy node 124 comprises a policy and rules charging function (PCRF), and packet routing node 126 comprises a SAEGW-user plane (SAEGW-U). An SAEGW is a combination of a serving gateway (SGW) and a packet data network gateway (PGW). Also, in 4G, IMS PDN/PDU 132 uses a PDN.

Access node 120, session management node 122, and policy node 124 carry signaling, such as call setup signaling, and are within a control plane of wireless network 110. Packet routing node 126 and proxy node 128 carry data packets, such as voice data packets, and are within a user plane of wireless network 110.

Proxy node 128 communicates with an IMS 130, which has IMS PDN/PDU 132 and a border gateway 134. IMS 130 connects wireless network 110 with PSAP 150, either with a packet switched connection, or with a circuit switched connection, such as through a public switched telephone network (PSTN) 154. In some examples, border gateway 134 provides the connection for IMS 130 between proxy node 128 and PSTN 154, bridging packet switched and circuit switched networks.

Proxy node 128 also permits wireless network 110 to connect to PSAP through an EPDN/EPDU 138. Packet routing node 126 connects to a PDN 156 (e.g., the internet) for other data services. Wireless network 160 may be configured similarly to wireless network 110.

Figure 2:
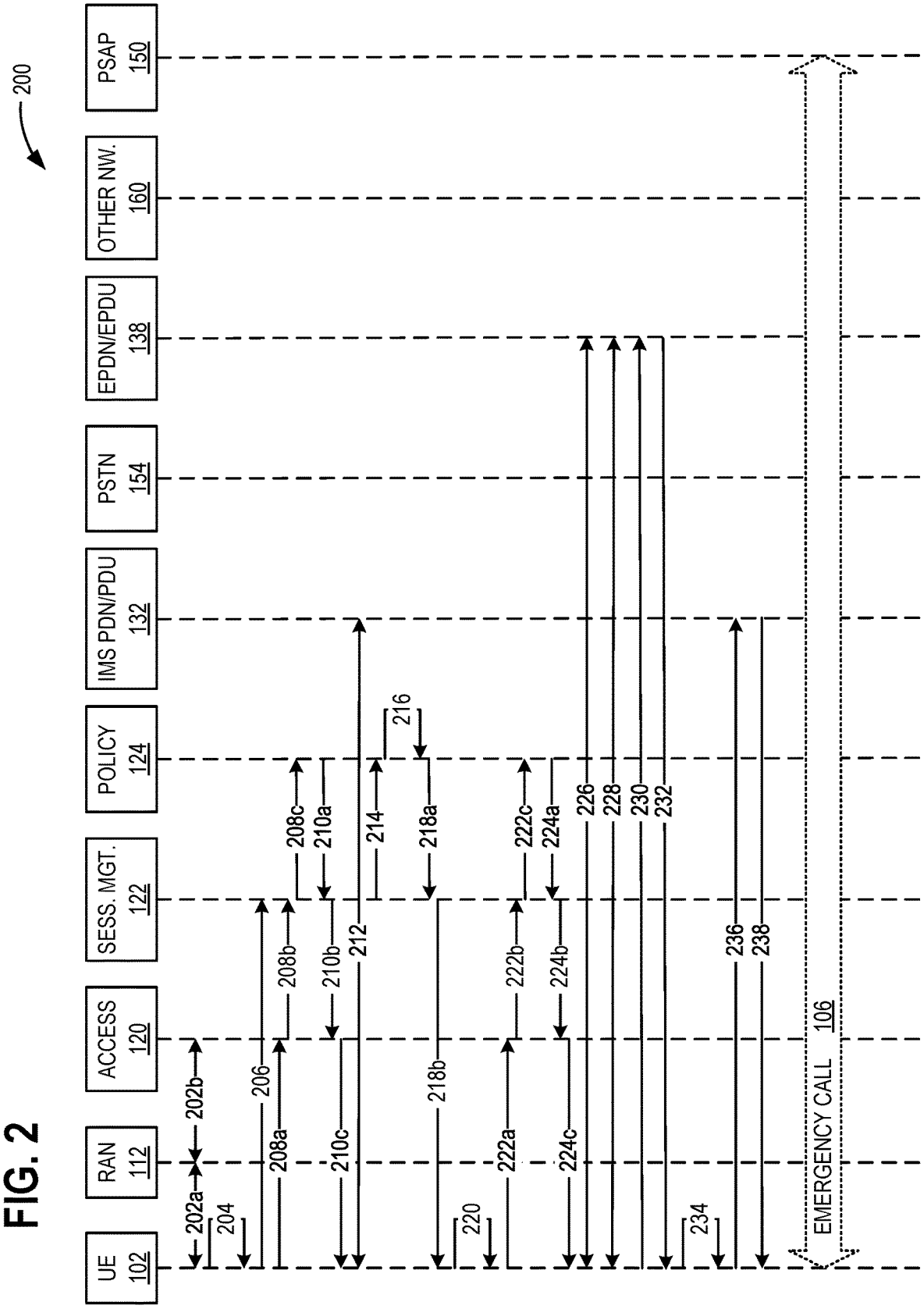
FIGS. 2 and 3 illustrate message sequence diagrams for messages that may be used in the architecture of FIG. 1.
Figure 3:
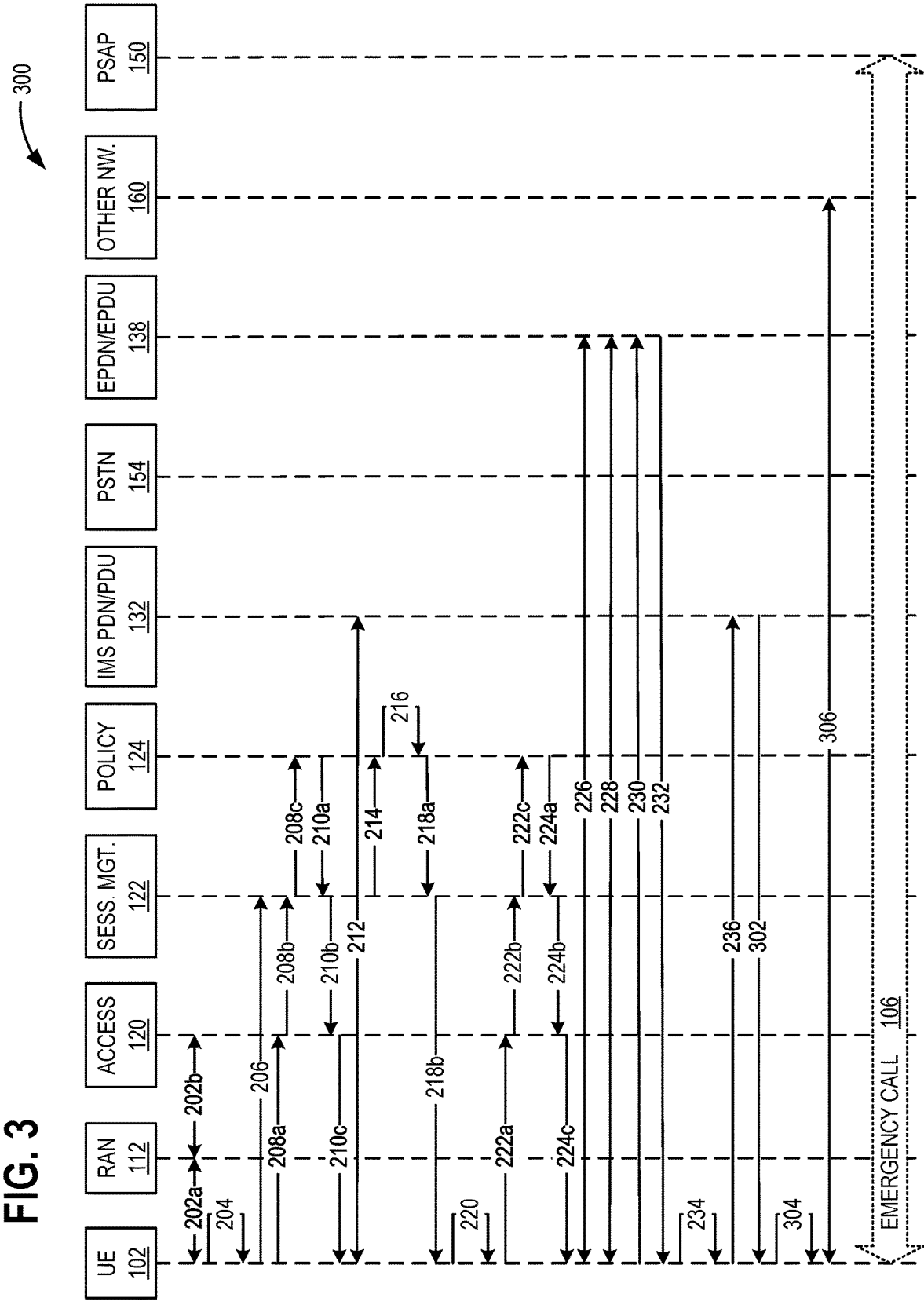

FIGS. 2 and 3 illustrate message sequence diagrams 200 and 300, respectively, for messages that may be used in (e.g., routed through) architecture 100, when UE 102 attempts to place emergency call 106. Message sequence diagram 200 of FIG. 2 shows messages for when the initial attempt to place emergency call 106 through EPDN/EPDU 138 is unsuccessful, but an attempt to place emergency call 106 through IMS PDN/PDU 132 is successful. Message sequence diagram 300 of FIG. 3 shows messages for when the initial attempt to place emergency call 106 through EPDN/EPDU 138, and the reattempt through IMS PDN/PDU 132, are both unsuccessful, and so UE 102 performs domain reselection to place emergency call 106 through cellular network 160.

Figure 4:
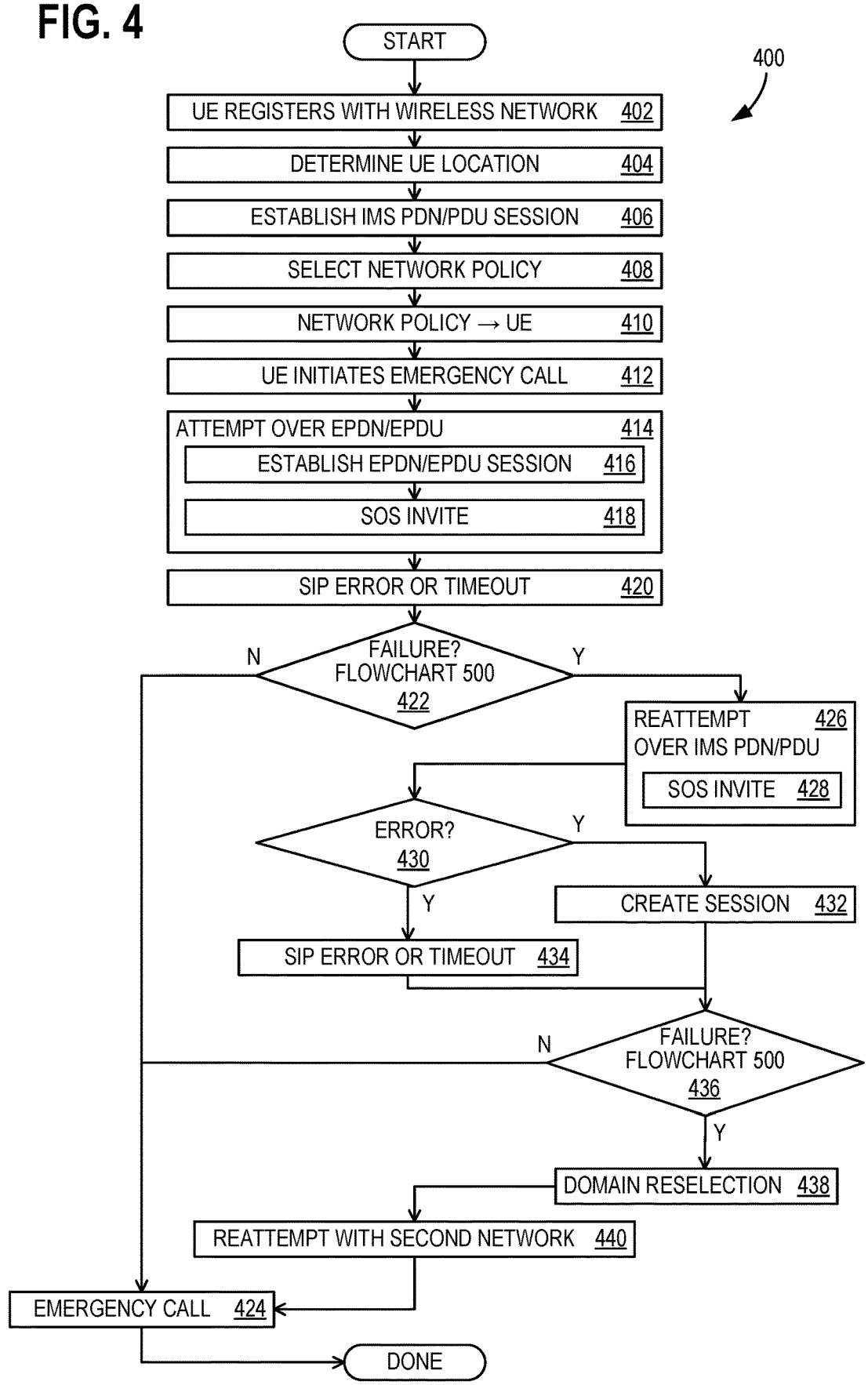
FIGS. 4-7 illustrate flowcharts of exemplary operations associated with the architecture of FIG. 1.

FIGS. 2 and 3 are described in conjunction with the description of FIG. 4, which illustrates a flowchart 400 of exemplary operations associated with UE 102 placing emergency call 106. In some examples, at least a portion of flowchart 400 may be performed using one or more computing devices 800 of FIG. 8. Flowchart 400 commences with UE 102 registering with wireless network 110 in operation 402. In some examples, UE 102 is in roaming coverage when connected to wireless network 110. The registration of operation 402 is shown as message 202a (UE 102 registering with RAN 112) and message 202b (UE 102 also registering with access node 120) in FIG. 2. For FIG. 3, messages 202a-236 are the same as in FIG. 2. FIG. 3 has further messages that are unique to operations 436-440 of flowchart 400.

The location of UE 102 determined in operation 404. Initially, wireless network 110 may use the known location of the serving cell site of RAN 112, until UE 10 obtains its location via GPS or other means, which is shown as message 204, and reports its location to wireless network 110 (e.g., session management node 122) using message 206.

Operation 406 establishes PDN connectivity (4G) or a PDUs session (5G) with IMS PDN/PDU 132, which is provided as IMS PDN/PDU session 212 (see FIG. 2), over wireless network 110 with messages 208a-210c. UE 102 requests a PDN/PDU connection using message 208a to access node 120, which creates a request message 208b to session management node 122, which forwards the request to policy node 124 using message 208c. Policy node 124 returns a create session response as message 210a to session management node 122, which forwards the response to access node 120 using message 210b. Access node 120 sends a connectivity accept message 210c to UE 102.

Network policy 140 is selected for UE 102 in operation 408. Session management node 122 uses message 214 to request policy node 124 to select a network policy 140 for UE 102, for example, based on at least the location of UE 102. Policy node 124 select a preferred network policy 140, shown as message 216, and sends it to session management node 122 using message 218a. In some examples, network policy 140 specifies that emergency call 106 is to be attempted over EPDN/EPDU 138 first and IMS PDN/PDU 132 second. In some examples, network policy 140 further specifies that domain reselection is to be performed after emergency call 106 fails with IMS PDN/PDU 132. In some examples (e.g., when wireless networks 110 and 160 have different sets of network policies 140), network policy 140 is based on at least UE 102 being attached to wireless network 110.

In operation 410, wireless network 110 transmits network policy 140 to UE 102 using message 218b, and UE 102 receives network policy 140 from wireless network 110. The user of UE 102 uses UE 102 to initiate emergency call 106 in operation 412, which is shown as message 220. In some examples, emergency call 106 comprises a 911 call or a 112 call, which may be e911 and e112 calls when placed from a UE connected to a wireless network.

In operation 414, UE 102 (e.g., following network policy 140), attempts emergency call 106 using EPDN/EPDU 138 over wireless network 110. This uses messages 222a-224c and message 230. Messages 222a-224c are similar to messages 206a-210c, but are for setting up an EPDN/EPDU session 226 (rather than IMS PDN/PDU session 212). Operation 414 uses operation 416 to set up EPDN/EPDU session 226, and operation 418 to transmit an SOS Invite message 230 to EPDN/EPDU 138.

If the setup of EPDN/EPDU session 226 is successful, it is accomplished in this manner: UE 102 requests a PDN connection using message 222a to access node 120, which creates a request message 222b to session management node 122, which forwards the request to policy node 124 using message 222c. Policy node 124 returns a create session response as message 224a to session management node 122, which forwards the response to access node 120 using message 224b. Access node 120 sends a connectivity accept message 224c to UE 102.

There are two error scenarios described herein. In one error scenario, the setup of EPDN/EPDU session 226 is successful within the allotted time, an emergency call IMS registration 228 is successful, and after UE 102 transmits SOS Invite message 230 to EPDN/EPDU 138, EPDN/EPDU 138 returns (transmits) an error message 232 to UE 102, such as a session initiation protocol (SIP) error. In some examples, the SIP error comprises a three-digit error code starting with 4, 5, or 6 (e.g., 4xx/5xx/6xx).

Another error scenario is that either the setup of EPDN/EPDU session 226 or emergency call IMS registration 228 is unsuccessful within the allotted time. Both error conditions are captured in operation 420.

Figure 5:
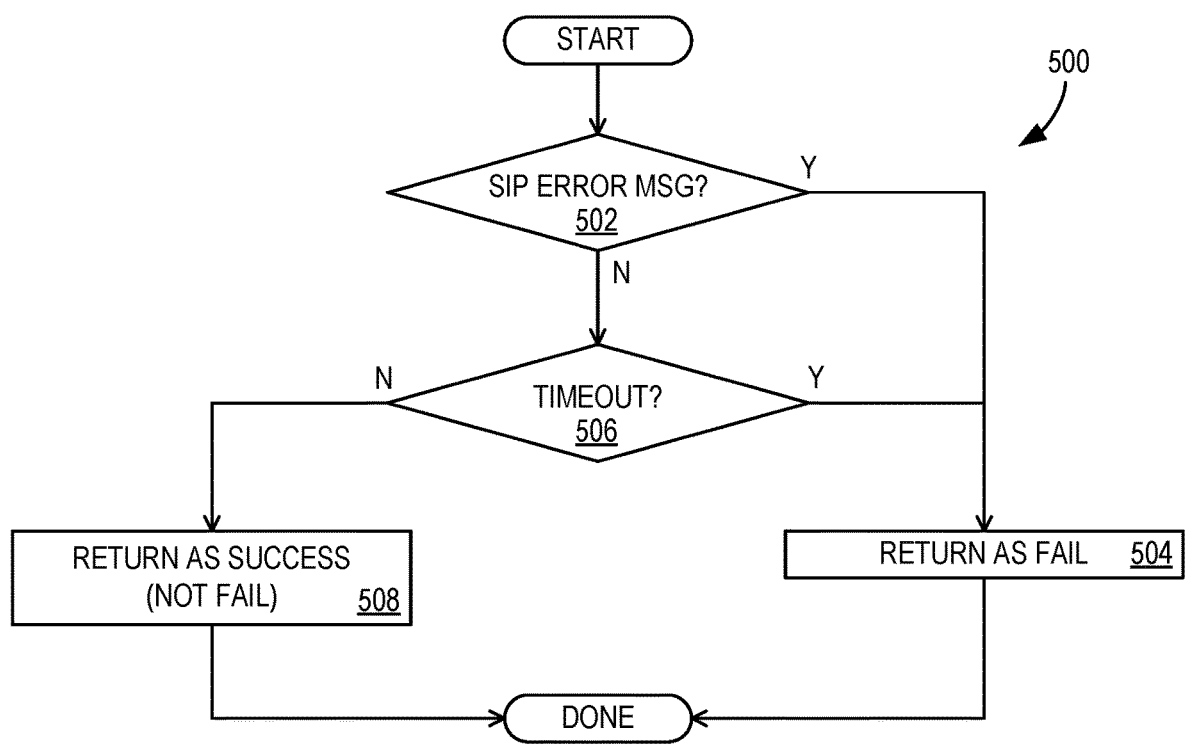

Decision operation 422 determines whether the attempt to make emergency call 106 using EPDN/EPDU 138 has failed, and is performed using flowchart 500 of FIG. 5. Turning briefly to FIG. 5, flowchart 500 is described. In some examples, at least a portion of flowchart 500 may be performed using one or more computing devices 800 of FIG. 8. Flowchart 500 is used as the process for both decision operation 422, which determines whether the attempt to make emergency call 106 using EPDN/EPDU 138 has failed, and also for decision operation 436 below, which determines whether the attempt to make emergency call 106 using IMS PDN/PDU 132 has failed.

In some examples, the operations of flowchart 500 are carried out within emergency call manager 142 of UE 102. Flowchart 500 commences with decision operation 502 determining whether an error message (e.g., error message 232 or an error message 302 of FIG. 3) has been received.

In some examples, an error message is a SIP error code starting with 4, 5, or 6. If so, operation 504, returns a failure condition (e.g., sets a failure flag), and flowchart 400 resumes.

However, if an error message has not been received, decision operation 506 determines whether there is a timeout condition. If so, flowchart 500 moves to operation 504 to return the error condition. Otherwise, operation 508 returns success (no failure), for example by setting a success flag, and flowchart 400 resumes.

Returning to flowchart 400 of FIG. 4, if the attempt to make emergency call 106 using EPDN/EPDU 138 did not fail, flowchart 400 moves to operation 424. In operation 424, based on at least a successful attempt at placing emergency call 106 using IMS PDN/PDU 132, wireless network 110 hosts emergency call 106, and UE 102 connects to emergency call 106.

However, in this example, the attempt to make emergency call 106 using EPDN/EPDU 138 did fail, so flowchart 400 moves to operation 426. Emergency call manager 142 consults network policy 140, shown as message 234, and of UE 102 reattempts emergency call 106 using IMS PDN/PDU 132 over wireless network 110. As part of operation 426, UE 102 transmits an SOS Invite message 236 to IMS PDN/PDU 132 in operation 428.

Decision operation 430 determines whether an error condition prevents completion of emergency call 106 over IMS PDN/PDU 132. If emergency call 106 can proceed over IMS PDN/PDU 132, a create session message 238 is sent (transmitted) to UE 102 in operation 432. Message 238 is shown only in FIG. 2.

In the alternative, if an error condition prevents placing emergency call 106 over IMS PDN/PDU 132, error message 302 is sent (transmitted) to UE 102 in operation 434. Error message 302 is shown only in FIG. 3. Error message 302 may be similar to error message 232. Decision operation 436 determines whether the attempt at making emergency call 106 using IMS PDN/PDU 132 has failed, and is performed using flowchart 500 as described above.

If the attempt has not failed, then remaining with the messages of FIG. 2, a connection accept message 238 is sent to UE 102, and flowchart 400 moves to operation 424.

However, if the attempt has failed, emergency call manager 142 consults network policy 140 and performs domain reselection in operation 438, selecting wireless network 160. This is shown as message 304 in FIG. 3. UE 102 registers with wireless network 160 using message 306. In operation 440, UE 102 reattempts emergency call 106 wireless network 160, and flowchart 400 moves to operation 424.

Figure 6:
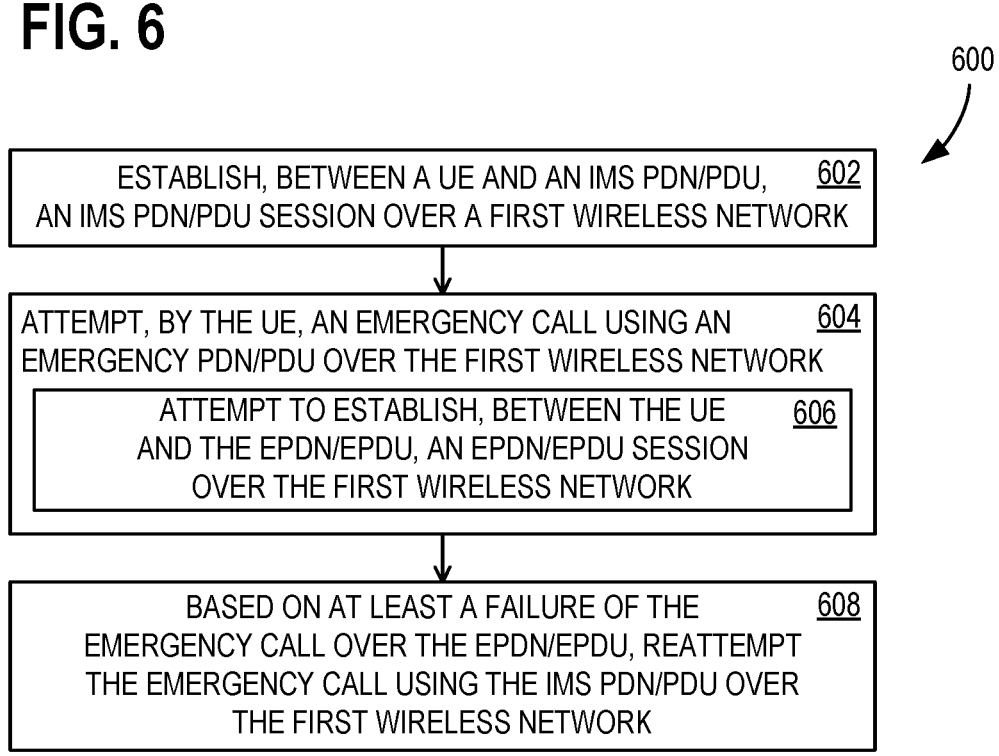

FIG. 6 illustrates a flowchart 600 of exemplary operations associated with examples of architecture 100. In some examples, at least a portion of flowchart 600 may be performed using one or more computing devices 800 of FIG. 8. Flowchart 600 commences with operation 602, which includes establishing, between a UE and an IMS PDN/PDU, an IMS PDN/PDU session over a first wireless network.

Operation 604 includes attempting, by the UE, an emergency call using an EPDN/EPDU over the first wireless network, and is performed using operation 606, which includes attempting to establish, between the UE and the EPDN/EPDU, an EPDN/EPDU session over the first wireless network. Operation 608 includes, based on at least a failure of the emergency call over the EPDN/EPDU, reattempting the emergency call using the IMS PDN/PDU over the first wireless network.

Figure 7:
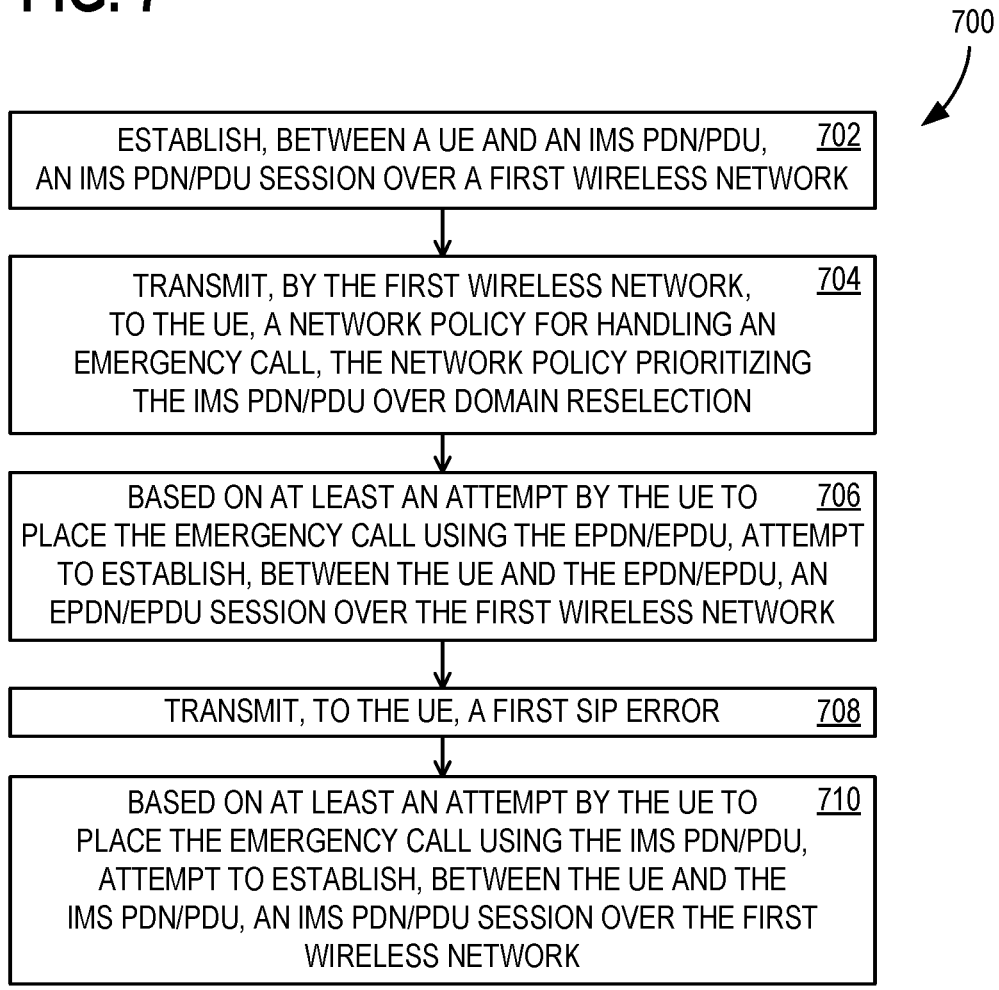

FIG. 7 illustrates a flowchart 700 of exemplary operations associated with examples of architecture 100. In some examples, at least a portion of flowchart 700 may be performed using one or more computing devices 800 of FIG. 8. Flowchart 700 commences with operation 702, which includes establishing, between a UE and an IMS PDN/PDU, an IMS PDN/PDU session over a first wireless network.

Operation 704 includes transmitting, by the first wireless network, to the UE, a network policy for handling an emergency call, the network policy prioritizing the IMS PDN/PDU over domain reselection. Operation 706 includes, based on at least an attempt by the UE to place the emergency call using the EPDN/EPDU, attempting to establish, between the UE and the EPDN/EPDU, an EPDN/EPDU session over the first wireless network. Operation 708 includes transmitting, to the UE, a first SIP error. Operation 710 includes, based on at least an attempt by the UE to place the emergency call using the IMS PDN/PDU, attempting to establish, between the UE and the IMS PDN/PDU, an IMS PDN/PDU session over the first wireless network.

Figure 8:
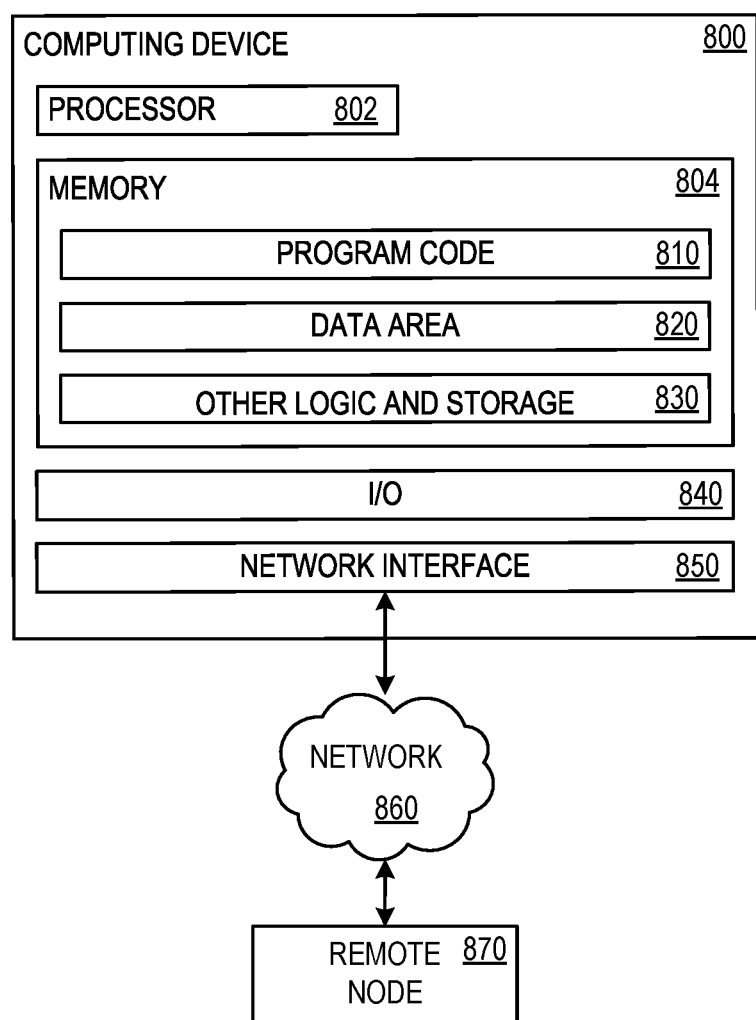
FIG. 8 illustrates a block diagram of a computing device suitable for implementing various aspects of the disclosure.

FIG. 8 illustrates a block diagram of computing device 800 that may be used as any component described herein that may require computational or storage capacity. Computing device 800 has at least a processor 802 and a memory 804 that holds program code 810, data area 820, and other logic and storage 830. Memory 804 is any device allowing information, such as computer executable instructions and/or other data, to be stored and retrieved. For example, memory 804 may include one or more random access memory (RAM) modules, flash memory modules, hard disks, solid-state disks, persistent memory devices, and/or optical disks. Program code 810 comprises computer executable instructions and computer executable components including instructions used to perform operations described herein. Data area 820 holds data used to perform operations described herein. Memory 804 also includes other logic and storage 830 that performs or facilitates other functions disclosed herein or otherwise required of computing device 800. An input/output (I/O) component 840 facilitates receiving input from users and other devices and generating displays for users and outputs for other devices. A network interface 850 permits communication over a network 860 with a remote node 870, which may represent another implementation of computing device 800. For example, a remote node 870 may represent another of the above-noted nodes within architecture 100.

Additional Examples

An example method of placing an emergency call over a wireless network comprises: establishing, between a UE and an IMS PDN/PDU, an IMS PDN/PDU session over a first wireless network: attempting, by the UE, an emergency call using an EPDN/EPDU over the first wireless network, the emergency call attempt using the EPDN/EPDU comprising: attempting to establish, between the UE and the EPDN/EPDU, an EPDN/EPDU session over the first wireless network; and based on at least a failure of the emergency call over the EPDN/EPDU, reattempting the emergency call using the IMS PDN/PDU over the first wireless network.

An example system for placing an emergency call over a wireless network comprises: a processor; and a computer-readable medium storing instructions that are operative upon execution by the processor to: establish, between a UE and an IMS PDN/PDU, an IMS PDN/PDU session over a first wireless network; attempt, by the UE, an emergency call using an EPDN/EPDU over the first wireless network, the emergency call attempt using the EPDN/EPDU comprising: attempting to establish, between the UE and the EPDN/EPDU, an EPDN/EPDU session over the first wireless network; and based on at least a failure of the emergency call over the EPDN/EPDU, reattempt the emergency call using the IMS PDN/PDU over the first wireless network.

One or more example computer storage devices has computer-executable instructions stored thereon, which, upon execution by a computer, cause the computer to perform operations comprising: establishing, between a UE and an IMS PDN/PDU, an IMS PDN/PDU session over a first wireless network: attempting, by the UE, an emergency call using an emergency PDN (EPDN/EPDU) over the first wireless network, the emergency call attempt using the EPDN/EPDU comprising: attempting to establish, between the UE and the EPDN/EPDU, an EPDN/EPDU session over the first wireless network; and based on at least a failure of the emergency call over the EPDN/EPDU, reattempting the emergency call using the IMS PDN/PDU over the first wireless network.

Another example method comprises: establishing, between a UE and an IMS PDN/PDU, an IMS PDN/PDU session over a first wireless network: transmitting, by the first wireless network, to the UE, a network policy for handling an emergency call, the network policy prioritizing the IMS PDN/PDU over domain reselection; based on at least an attempt by the UE to place the emergency call using the EPDN/EPDU, attempting to establish, between the UE and the EPDN/EPDU, an EPDN/EPDU session over the first wireless network: transmitting, to the UE, a first SIP error; and based on at least an attempt by the UE to place the emergency call using the IMS PDN/PDU, attempting to establish, between the UE and the IMS PDN/PDU, an IMS PDN/PDU session over the first wireless network.

Another example system for placing an emergency call over a wireless network comprises: a processor; and a computer-readable medium storing instructions that are operative upon execution by the processor to: establish, between a UE and an IMS PDN/PDU, an IMS PDN/PDU session over a first wireless network: transmit, by the first wireless network, to the UE, a network policy for handling an emergency call, the network policy prioritizing the IMS PDN/PDU over domain reselection; based on at least an attempt by the UE to place the emergency call using the EPDN/EPDU, attempt to establish, between the UE and the EPDN/EPDU, an EPDN/EPDU session over the first wireless network; transmit, to the UE, a first SIP error; and based on at least an attempt by the UE to place the emergency call using the IMS PDN/PDU, attempt to establish, between the UE and the IMS PDN/PDU, an IMS PDN/PDU session over the first wireless network.

One or more additional computer storage devices has computer-executable instructions stored thereon, which, upon execution by a computer, cause the computer to perform operations comprising: establishing, between a UE and an IMS PDN/PDU, an IMS PDN/PDU session over a first wireless network: transmitting, by the first wireless network, to the UE, a network policy for handling an emergency call, the network policy prioritizing the IMS PDN/PDU over domain reselection; based on at least an attempt by the UE to place the emergency call using the EPDN/EPDU, attempting to establish, between the UE and the EPDN/EPDU, an EPDN/EPDU session over the first wireless network; transmitting, to the UE, a first SIP error; and based on at least an attempt by the UE to place the emergency call using the IMS PDN/PDU, attempting to establish, between the UE and the IMS PDN/PDU, an IMS PDN/PDU session over the first wireless network.

Alternatively, or in addition to the other examples described herein, examples include any combination of the following:

receiving, by the UE, from the first wireless network, a network policy for handling the emergency call, the network policy prioritizing the IMS PDN/PDU over domain reselection;
based on at least a failure of the emergency call over the IMS PDN/PDU, performing domain reselection;
reattempting the emergency call using a second wireless network;
based on at least a successful attempt at placing the emergency call, connecting to the emergency call;
the emergency call attempt using the EPDN/EPDU further comprises transmitting, by the UE, to the EPDN/EPDU, an SOS Invite;
the emergency call attempt using the IMS PDN/PDU comprises transmitting, by the UE, to the IMS PDN/PDU, an SOS Invite;
the UE is in roaming coverage when connected to the first wireless network;
transmitting, by the first wireless network, to the UE, the network policy;
the UE registering with the first wireless network;
determining a location of the UE;
the network policy specifies that the emergency call is to be attempted over the EPDN/EPDU first and the IMS PDN/PDU second;
the network policy further specifies that domain reselection is to be performed after the emergency call fails with the IMS PDN/PDU;
the network policy is based on at least the location of the UE;
the network policy is based on at least the UE being attached to the first wireless network;
the user initiates an emergency call;
the emergency call comprises a 911 call or a 112 call;
based on at least an attempt by the UE to place the emergency call using the IMS PDN/PDU, attempting to establish, between the UE and the EPDN/EPDU, an EPDN/EPDU session over the first wireless network;
transmitting, to the UE, a first SIP error;
determining whether the emergency call attempt using the EPDN/EPDU has failed;
determining whether the emergency call attempt using the EPDN/EPDU has failed comprises receiving a first SIP error;
the first SIP error comprises an error code starting with 4, 5, or 6;
determining whether the emergency call attempt using the EPDN/EPDU has failed comprises detecting a timeout condition;
transmitting, to the UE, a second SIP error;
determining whether the emergency call attempt using the IMS PDN/PDU has failed;
determining whether the emergency call attempt using the IMS PDN/PDU has failed comprises receiving a second SIP error;
the second SIP error comprises an error code starting with 4, 5, or 6;
determining whether the emergency call attempt using the IMS PDN/PDU has failed comprises detecting a timeout condition; and
based on at least a successful attempt at placing the emergency call using the IMS PDN/PDU, hosting the emergency call.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:
   establishing, by a user equipment (UE), an internet protocol (IP) multimedia subsystem (IMS) packet data network (PDN) or protocol data unit (PDU) network (IMS PDN/PDU) session over a first wireless network;
   detecting, by the UE, an emergency call of a user after establishing the PDN/PDU session;
   requesting, by the UE, establishment of an emergency PDN/PDU (EPDN/EPDU) session for the emergency call over the first wireless network
   detecting, by the UE, a failure to establish the EPDN/EPDU session over the first wireless network; and
   based on at least the failure to establish the EPDN/EPDU session for the emergency call over the first wireless network, reattempting the emergency call using the IMS PDN/PDU session over the first wireless network.

2. The method of claim 1, further comprising:
   receiving, by the UE, from the first wireless network, a network policy for handling the emergency call, the network policy prioritizing the IMS PDN/PDU session over domain reselection.

3. The method of claim 1, wherein requesting establishment of the EPDN/EPDU session comprises;
   transmitting, by the UE, an SOS Invite to an EPDN/EPDU network device.

4. The method of claim 1, wherein reattempting the emergency call using the IMS PDN/PDU session comprises:
   transmitting, by the UE, an SOS Invite to an IMS PDN/PDU network device.

5. The method of claim 1, wherein the UE is in roaming coverage when connected to the first wireless network.

6. A system for placing an emergency call over a wireless network, the system comprising:
   a processor; and
   a computer-readable medium storing programming instructions for execution by the processor, the programming instructions, upon execution by the processor, causing the system to:
   establish, by a user equipment (UE), an internet protocol (IP) multimedia subsystem (IMS) packet data network (PDN) or protocol data unit (PDU) network (IMS PDN/PDU) session over a first wireless network;

detect, by the UE, an emergency call of a user after establishing the PDN/PDU session;

request, by the UE, establishment of an emergency PDN/PDU (EPDN/EPDU) session for the emergency call over the first wireless network;

detect, by the UE, a failure to establish the EPDN/EPDU session over the first wireless network; and based on at least the failure to establish the EPDN/EPDU session for the emergency call over the first wireless network, reattempt the emergency call using the IMS PDN/PDU session over the first wireless network.

7. The system of claim 6, wherein the instructions are further operative to:

receive, by the UE, from the first wireless network, a network policy for handling the emergency call, the network policy prioritizing the IMS PDN/PDU session over domain reselection.

8. The system of claim 6, wherein requesting establishment of the EPDN/EPDU session comprises:

transmitting, by the UE, an SOS Invite to an EPDN/EPDU network device.

9. The system of claim 6, wherein reattempting the emergency call using the IMS PDN/PDU session comprises:

transmitting, by the UE, an SOS Invite to an IMS PDN/PDU network device.

10. The system of claim 6, wherein the UE is in roaming coverage when connected to the first wireless network.

11. One or more computer storage devices having programming instructions stored thereon, which, upon execution by a processor of a user equipment (UE), cause the UE to perform operations comprising:

establishing, by the UE, an internet protocol (IP) multimedia subsystem (IMS) packet data network (PDN) or protocol data unit (PDU) network (IMS PDN/PDU) session over a first wireless network;

detecting, by the UE, an emergency call of a user after establishing the PDN/PDU session;

requesting, by the UE, establishment of an emergency PDN/PDU (EPDN/EPDU) session for the emergency call over the first wireless network;

detecting, by the UE, a failure to establish the EPDN/EPDU session over the first wireless network; and based on at least the failure to establish the EPDN/EPDU session for the emergency call over the first wireless network, reattempting the emergency call using the IMS PDN/PDU session over the first wireless network.

12. The one or more computer storage devices of claim 11, wherein the operations further comprise:

receiving, by the UE, from the first wireless network, a network policy for handling the emergency call, the network policy prioritizing the IMS PDN/PDU session over domain reselection.

13. The one or more computer storage devices of claim 11, wherein requesting establishment of the EPDN/EPDU session comprises:

transmitting, by the UE, an SOS Invite to an EPDN/EPDU network device.

14. The one or more computer storage devices of claim 11, wherein reattempting the emergency call using the IMS PDN/PDU session comprises:

transmitting, by the UE, an SOS Invite to an IMS PDN/PDU network device.

15. The one or more computer storage devices of claim 11, wherein requesting establishment of the EPDN/EPDU session comprises transmitting, by the UE, a message to an access node in the first wireless network, the message requesting setup of the EPDN/EPDU session.

16. The one or more computer storage devices of claim 11, wherein the IMS PDN/PDU session is a non-emergency data session.

17. The system of claim 6, wherein requesting establishment of the EPDN/EPDU session comprises transmitting, by the UE, a message to an access node in the first wireless network, the message requesting setup of the EPDN/EPDU session.

18. The system of claim 6, wherein the IMS PDN/PDU session is a non-emergency data session.

19. The method of claim 1, wherein requesting establishment of the EPDN/EPDU session comprises transmitting, by the UE, a message to an access node in the first wireless network, the message requesting setup of the EPDN/EPDU session.

20. The method of claim 1, wherein the IMS PDN/PDU session is a non-emergency data session.

* * * * *